Jan. 4, 1944. H. H. FINK 2,338,323
RESILIENT MOUNTING
Filed Oct. 17, 1942 2 Sheets-Sheet 1

Inventor
Herbert H. Fink
By Willis F. Avery
Atty.

Jan. 4, 1944. H. H. FINK 2,338,323
RESILIENT MOUNTING
Filed Oct. 17, 1942 2 Sheets-Sheet 2

Inventor
Herbert H. Fink
By Willis F. Avery
Atty.

Patented Jan. 4, 1944

2,338,323

UNITED STATES PATENT OFFICE 2,338,323

RESILIENT MOUNTING

Herbert H. Fink, Akron, Ohio, assignor to The B. F. Goodrich Company, New York, N. Y., a corporation of New York Application October 17, 1942, Serial No. 462,333

6 Claims. (Cl. 248—358)

This invention relates to resilient mountings, and is useful especially in applications where it is desired that the mounted objects have considerable freedom of movement in several directions or in all directions.

The invention has utility in a variety of applications, including the mounting of aircraft compass housings and other instruments, motors for musical instruments and other uses, flexible power transmitting couplings, and in general where it is desired to mount structures resiliently.

The chief objects of the invention are to provide a mounting having extensive freedom of movement in several directions or in all directions, to provide compactness of structure and to provide for convenience of manufacture and assembly.

Related objects are to provide a mounting utilizing resilient rubber or other rubber-like material in a manner to permit movement by a variety of stresses in the rubber, including shear stress, bending stress and torsional or twisting stress, and to provide a mounting in which the resilient material is stressed simultaneously in both shear and torsion to give large deflections under small loads.

These and further objects will be apparent from the following description, reference being had to the accompanying drawings in which.

Figure 1:
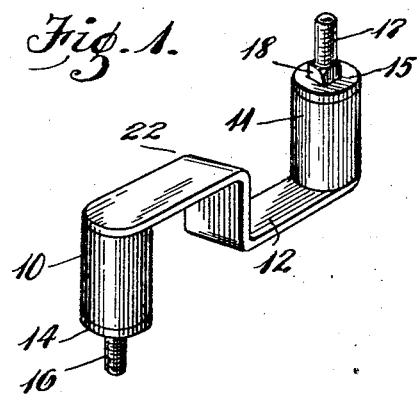
Fig. 1 is a perspective view of a mounting constructed in accordance with and embodying the invention.
Figure 3:
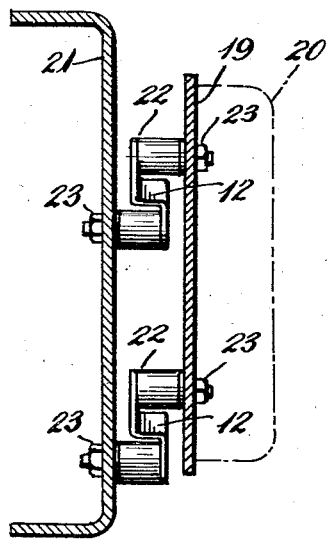
Fig. 3 is a section taken along the line 3—3 of Fig. 2.
Figure 2:
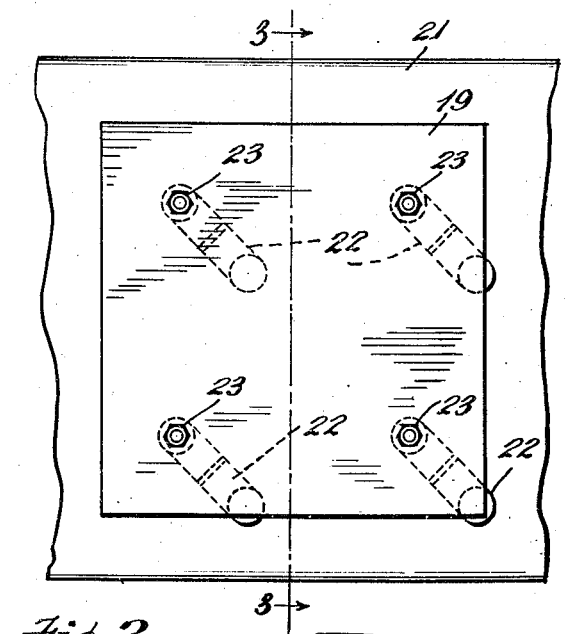
Fig. 2 is a front elevation of a portion of an instrument panel illustrating a given manner of utilizing the mounting in accordance with the invention.

With reference first to Figs. 1 to 3, the mounting of this illustrative embodiment comprises a pair of bodies 10 and 11 of resilient rubber or other rubber-like material, preferably cylindrical, which bodies are secured preferably through a vulcanized bond to opposite faces of and at opposite ends of an arm 12 which may be of flat strip metal such, for example, as brass. The arm 12 may be formed with a reverse bend indicated generally at 15 to reduce the overall width of the mounting, and the arrangement is such that the bodies 10 and 11 extend outwardly in opposite directions from the arm 12 to an extent sufficient to clear the arm structure amply. End plates 14 and 15 of brass or other suitable metal are secured as by a vulcanized bond to the projecting ends of the bodies 11 and 12, and these plates may be provided with projecting screws 16 and 17 for the purpose of attachment. If desired the base of the screws may be polygonal as indicated at 18 for the purpose of securing these ends of the mounting against rotation. The arrangement is such that with the screw ends of the mounting secured one to a support and the other to a supported structure in non-slipping relation and with the axes of the bodies 10 and 11 disposed horizontally or nearly so, the weight of the supported structure will cause endwise twisting or torsional stress to be imposed upon the resilient bodies through a swinging movement of the arm 12, and also shear stress and bending stress in the resilient bodies as a result of the cantilever suspension. The mounting is also capable of resisting movements parallel to the axes of the resilient bodies 10 and 11 by bending stresses in such bodies and also by compressive stresses therein. The movement permitted by the bodies 10 and 11 are additive because of the series arrangement and the mounting affords a high degree of freedom of movement in all directions. The mounting is nevertheless compact and sturdy.

The mounting may be positioned with the axes of the resilient bodies disposed horizontally or vertically or in any other direction according to the needs of a particular installation.

In Figs. 2 and 3 there is illustrated by way of example an installation of four of the mountings in a manner to support a vertically extending backing plate 19 of an instrument 20 from a vertically disposed support 21. The mountings, designated at 22, 22, are mounted at four spaced-apart positions and are secured to the plate 19 and support 21 by means of the end screws of the mountings which extend through apertures in these parts and are held in place by means of nuts 23, 23. By disposing the mountings all parallel and in the same corresponding directions, a diagonal disposition of the mountings being shown in Figs. 2 and 3, the backing plate 19 and its instrument 20 are supported by the resilient bodies through torsional bending and shear stress and movements in a vertical plane are accommodated by one or both of these types of stresses in the mountings. Movement of the instrument toward and away from the support 21 is permitted by bending and compressive stresses in the resilient bodies, so that the instrument is universally mounted and cushioned and has great freedom of movement especially in all directions in the vertical plane of the plate 19.

Figure 4:
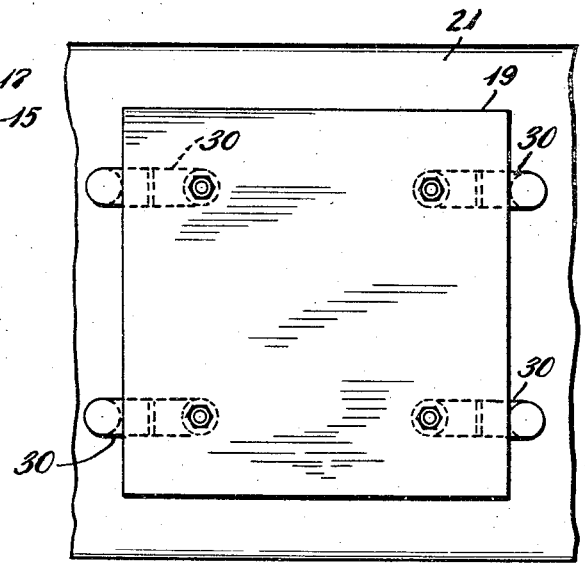
Fig. 4 is a view like Fig. 3 but showing another way to dispose the mountings of the invention.

Because the degrees of movement permitted by the cylindrical resilient bodies may be made different with respect to the stresses in torsion, in shear, in bending and in compression, the freedom or limitation of movement in a particular direction or directions may be controlled by the disposition of the mounting or a group of the mountings. For example with reference to Fig. 4, by disposing the mountings horizontally as shown at 30, 30 with the attachments to the support all away from the center of the instrument, the movements of the instrument in the vertical direction are cushioned by a combination of torsional, shear and bending stress in the resilient bodies, whereas movements horizontally in the plane of the backing plate are resisted chiefly by bending and shear stresses in the bodies.

Figure 5:
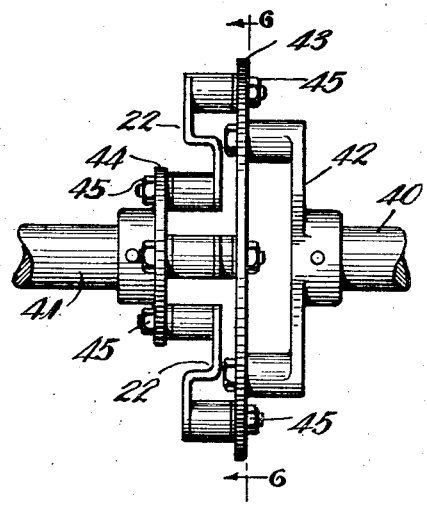
Fig. 5 is a side elevation of a flexible shaft coupling utilizing the mountings of the invention as the coupling means thereof.
Figure 6:
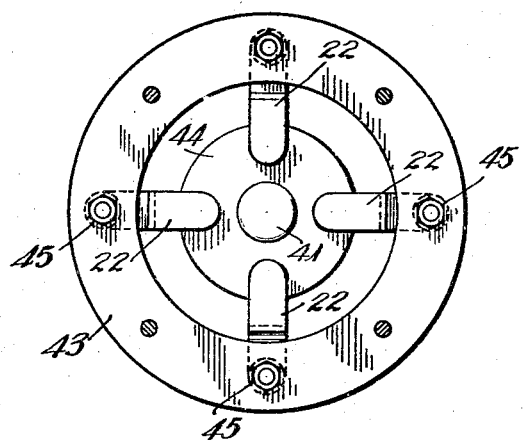
Fig. 6 is a section taken along the line 6—6 of Fig. 5.

In the installation illustrated in Figs. 5 and 6, the mountings are utilized to couple a pair of shafts 40 and 41 for transmitting rotation from one to the other and to permit a universal joint action, the mountings being arranged for effectiveness especially in cushioning impulses in torque. Upon the end of shaft 40 is mounted a spider 42 which is bolted to a ring plate 43. A flange plate 44 is mounted upon the end of shaft 41. Between the plates 44 and 43 are mounted four of the mountings 22, 22 with the arms of the mountings extending radially outward and with the end attaching screws secured to the respective plates 43, 44 by nuts 45, 45. The arrangement is such that torque thrusts from one shaft to the other are transmitted through the resilient bodies of the mountings largely by torsional, shear and bending stresses therein. Movement of the parts toward each other introduces compression in the mountings in addition to one or more of the other stresses. A shaft coupling is provided which is highly flexible in all directions and especially so in torque.

Figure 7:
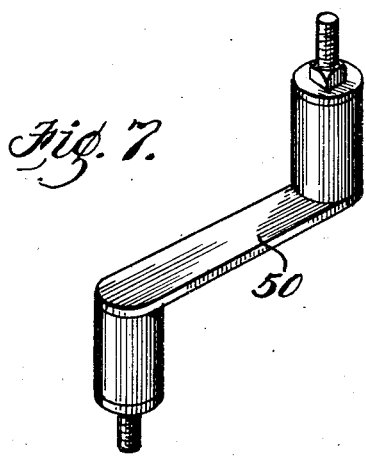
Fig. 7 is a view like Fig. 1, but showing a modified construction.

While it is preferred to provide arm 12 with the reversed bend 13 as hereinabove described with reference to Fig. 1, for the sake of compactness, the arm may if desired be straight as shown at 50 in the embodiment of Fig. 7 or of any other suitable shape where space requirements are satisfied. The remaining parts of the mounting may be as described hereinabove with reference to Fig. 1.

In the constructions hereinabove described the arm of the mounting has a pivotal action at both of its ends as a result of the two resilient bodies, which not only doubles the flexibility, but greatly increases the facility of obtaining torsional action of the resilient bodies which is of advantage in providing great flexibility of movement. In some cases the torsional action may be obtained with only one resilient body, as is shown, for example, in Fig. 8, wherein a cylindrical body 60 of resilient rubber or other rubber-like material has secured to it at one end, as by a vulcanized bond, a plate 61 having an attaching screw 62 for securing this end of the body firmly to a support. At the other end of the resilient body 60 is secured, as by a vulcanized bond, an arm 63 projecting laterally away from the resilient body. A supported structure may be mounted at the end of the arm 63 as by means of a bolt passed through an aperture 64 so that the supported structure will be suspended through the resilient body 60 while the arm 63 imposes a torsional or twisting action upon the resilient body. Great freedom of movement may thus be provided for the supported structure, which movement may be increased by lengthening the arm 63. One or more mountings may be used in an installation.

Figure 8:
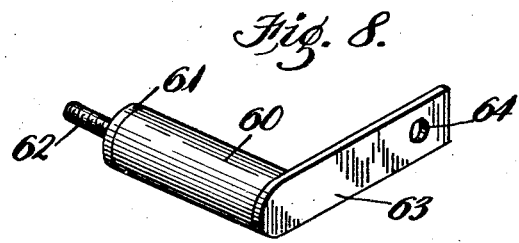
Fig. 8 is a perspective view of a further modified construction.
Figure 9:
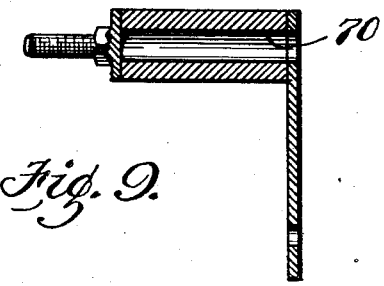
Fig. 9 is a sectional view of a still further modification.

In any of the embodiments described herein the resilient cylinders may be solid, or they may be hollow as is shown at 70 in the embodiment of Fig. 9, which is otherwise like the construction in Fig. 8. The hollow construction makes for greater yieldability, and the strength of the mounting to resist the torsional action is not greatly affected by eliminating the resilient material at the center only of the cylinder.

Variations may be made without departing from the scope of the invention as defined by the following claims.

I claim:

1. A resilient mounting comprising attaching means, a body of resilient rubber-like material secured at one end thereof to said attaching means and projecting freely therefrom, and attaching means at the opposite end of said body including an arm structure secured permanently to said body and extending laterally therefrom for imparting shear, torsional and bending stresses to said body under deflection of the arm structure.

2. A resilient mounting comprising attaching means for securing the mounting to a support, a body of resilient rubber-like material secured at one end thereof to said attaching means and projecting freely therefrom, and attaching means at the opposite end of said body comprising an arm structure secured to said body and projecting laterally therefrom for attachment of the projecting portion of the arm structure at a position laterally spaced from said body to a structure to be supported to support the same through shear, torsional and bending stresses in said body.

3. A resilient mounting comprising an arm structure, a body of resilient rubber-like material secured at an end thereof to said arm structure and extending laterally thereof, a second body of resilient rubber-like material secured at an end thereof to said arm structure at a position spaced from the first said body and extending in a lateral direction of the arm structure opposite to that of the first said body, and attaching means at the ends of the respective bodies remote from said arm structure.

4. A resilient mounting as defined in claim 3 in which said arm is reverse-bent in a manner reducing the overall width of the mounting between said attaching means.

5. A resilient mounting comprising an arm structure, bodies of resilient rubber-like material permanently secured at spaced-apart positions to said arm structure and extending laterally thereof, and attaching means secured to the projecting ends of the respective bodies.

6. A resilient mounting comprising an arm structure, bodies of resilient rubber-like material bonded by vulcanization to the respective ends of said arm structure at opposite sides of the arm structure and being in the form of cylinders extending with their axes parallel and transversely of the arm structure and attaching means including threaded members secured to the projecting ends of the respective cylinders, said arm structure being reverse-bent in a manner reducing the overall width of the mounting between said attaching means.

HERBERT H. FINK.